United States Patent [19]
Bannat et al.

[11] Patent Number: 6,153,682
[45] Date of Patent: Nov. 28, 2000

[54] FIRE-RESISTANT COMPOSITION FOR USE AS A WOOD-REPLACEMENT MATERIAL

[76] Inventors: Salah M. Bannat, 13750 Mahan Rd., #1113, Dallas, Tex. 75240; Hossin A. Abdeldayem, 9026 Craigmont Rd., Huntsville, Ala. 35802

[21] Appl. No.: 09/184,014

[22] Filed: Nov. 2, 1998

[51] Int. Cl.[7] .................................................. C08K 3/34
[52] U.S. Cl. ............................................................. 524/492
[58] Field of Search ............................................... 524/492

[56] References Cited

U.S. PATENT DOCUMENTS

| | | |
|---|---|---|
| 4,176,115 | 11/1979 | Hartman et al. . |
| 4,268,574 | 5/1981 | Peccenini et al. . |
| 4,336,181 | 6/1982 | Iseler et al. . |
| 4,557,961 | 12/1985 | Gorges ..................................... 428/117 |
| 4,629,954 | 12/1986 | Banzai et al. . |
| 5,100,715 | 3/1992 | Zimmerman ............................ 428/147 |
| 5,451,620 | 9/1995 | Cepeda-Guerra . |

*Primary Examiner*—Paul R. Michl
*Attorney, Agent, or Firm*—Larson & Taylor PLC

[57] ABSTRACT

A composition suitable for use as a building material is provided which comprises a waterproof outer gel coating to which fire retardant may be added and an inner material comprised of a combination of a fire-retardant resin, a moisture-controlling resin, a hardening and stabilizing resin, and an acid-resistant resin, along with chopped or ground fiberglass, wood pieces, and other ingredients as necessary to harden and activate the mixture. In addition, other suitable additives may be included as necessary to achieve slower curing time or to facilitate the extraction of the finished product from the mold. The resulting composition that is provided herein is advantageous because it is an environmentally safe, waterproof, fire resistant building material that is easily shaped and economically versatile, and because it can be used as a substitute for wood or fiberglass in a variety of applications.

21 Claims, No Drawings

FIRE-RESISTANT COMPOSITION FOR USE AS A WOOD-REPLACEMENT MATERIAL

FIELD OF THE INVENTION

This invention relates in general to a composition useful as a wood replacement material in many applications, and in particular to a waterproof, fire-resistant composition that may be used as a building material which is comprised of a combination of resins, chopped or ground fiberglass, wood pieces, and other materials, and which is useful as a replacement for wood, fiberglass, or other standard materials in a variety of applications, including building foundations as well as their external and internal constructions, kitchen cabinets, kitchen countertops, home and office furniture, boat bodies, car bumpers, floor tiles, roof shingles, telephone and utility columns, sewer pipes, and other like applications.

BACKGROUND OF THE INVENTION

Although wood has traditionally been one of the most popular materials to use in the construction of furniture and other furnishings in the home or office setting, the major drawback to the use of wood has been its flammability. One particular problem that has arisen is the flammability associated with wood furnishings in the kitchen, including kitchen cabinets, paneling, countertops, drawers, and even tables and chairs which are made of wood, all of which may constitute a serious fire hazard in conjunction with the dangers normally found in the kitchen, particularly open flames or other high-temperature appliances. In fact, despite the heightened concerns over the past few years with regard to fire safety in the kitchen, it has been determined that more than 90% of home fires start in the kitchen, and such fires still result in substantial economic and personal loss every year.

In addition, the excessive demand for wood and wood products over the course of time has resulted in a substantial depletion of forests worldwide, and this over-utilization of forest resources and subsequent loss of forest land is thought to be a major factor contributing to global warming. As a result, there is a distinct need to lower the overall demand for wood and wood products in order to substantially reduce the amount of trees cut from forests.

Accordingly, there is a substantial need for a wood-replacement material which can be substituted for wood in a variety of applications, but which can be made more durable and able to withstand harsh weather conditions, moisture, termites, and yet be fire-resistant as well. In addition, there is a substantial need for a suitable material for use in the home or office setting which will easy to mold into a variety of shapes and sizes so as to be useful in a wide range of applications, yet which when formed will exhibit high dimensional stability and impact and scratch resistance. Finally, there is a substantial need for a building material which will be attractive yet economical, and entirely environmentally safe. Although there are many fire-resistant building materials that have been previously disclosed or used in certain applications, such as those disclosed in U.S. Pat. Nos. 4,176,115, 4,629,954, 4,268,574, 4,336,181 and 5,451,620, there are no materials currently available which can provide an attractive, environmentally-safe, fire-resistant building material that can be substituted for wood in many applications, including areas such as home construction, kitchen cabinets and other kitchen furnishings wherein fire resistance is extremely desirable.

SUMMARY OF THE INVENTION

Accordingly, it is thus an object of the present invention to provide a material for use in place of wood in a variety of applications such as kitchen cabinets and other kitchen furniture, home construction, home and office furniture, panels and many other possible applications such as those described above, or other similar applications in this field as would be readily understood by one of ordinary skill in the art.

It is further an object of the present invention to provide a composition for use as a replacement material for wood in home or office furnishings which will be fire-proof, durable, attractive and economical.

It is even further an object of the present invention to provide a material suitable for use in home or office furnishings which will be easily moldable, yet highly scratch and impact resistant and dimensionally stable.

It is still further an object of the present invention to provide a material useful in a variety of home and office building applications which will also be inexpensive and environmentally safe.

These and other objects are achieved by virtue of the present invention which provides a composition suitable for use as a building material comprising an outer gel coating to which a fire retardant may be added, and an inner material comprised of a combination of resins to provide hardness, resistance to fire and acid, and dimensional stability, along with chopped or ground fiberglass, wood pieces, and other ingredients as necessary to harden and activate the mixture. In addition, other suitable additives may be included as necessary to achieve slower curing time or ease of extraction of the finished product from the mold. The resulting product that is provided herein is an environmentally safe, fire resistant building material that is easily shaped and economically versatile, and thus can be substituted for wood in a variety of applications.

Other features and advantages of the invention will be described in, or become obvious from, the detailed description of the preferred embodiments described hereinbelow.

DETAILED DESCRIPTION OF THE PREFERRED EMBODIMENTS

In accordance with the present invention, a composition suitable for use as a fire-resistant building material is provided which comprises an outer gel coating to which a fire retardant may be added, and an inner material comprising a combination of resins to provide hardness, fire and acid resistance and dimensional stability, along with chopped or ground fiberglass, wood pieces, and other ingredients as necessary to harden and activate the mixture. This building material composition has been identified by the name "SALBA" by the inventors, and is ideal for use as an all-purpose building material which can be substituted for wood in a variety of applications.

In the preferred embodiment, the combination of resins that will constitute the inner material of the composition identified as "SALBA" will comprise: (1) any of the fire retardant family of resins, such as any of the Hetron series FR610, FR1540, and FR92, which are brominated polyester resin products of the Ashland Chemical Company, or the like; (2) any of the moisture-controlling family of resins, such as the resilient isophthalic polyester resin series including resins marketed under the designations Aropol 7334, Aropol 7530, and Aropol 7430 (Ashland Chemical), or the like; (3) any of the hardening and stabilizing family of resins, such as the polyester resin for matched-die molding series sold under the brand designations Aropol 8420, Aropol 8310, and Aropol 8110, or the like, or Aropol 7221 isophthalic polyester resin (Ashland Chemical), which is particularly preferred where chemical resistance is desired; and (4) any of the acid resistant family of resins, such as the chemical resistant isophthalic polyester resins such as Aropol 7240, Aropol 7220 and Aropol 7240T-15 (Ashland Chemical), all of the above resins provided in roughly equal amounts. As would be readily understood by one of ordinary skill in this art, there are a number of suitable resins that will fall into each of the four categories of resins in the preferred embodiment of the invention, as set forth above, and thus a wide range of resins that can be provided by a number of vendors all over the United States and can be employed in the invention. In addition, in order to keep the product environmentally safe, it is preferred that the resins that are used in the invention be of the type such as those specified above which do not give off any harmful gases or other hazardous by-products.

In addition to the combination of resins, the inner material of the invention also preferably comprises chopped or ground fiberglass which may be mixed with the resin mix to form the inner material of the composition. It is preferred that the chopped fiberglass be added in the ratio of roughly 1 part of chopped fiberglass for every 10 parts by weight of resin in the mix.

It is also preferred that other suitable ingredients will also be added to the inner material of the composition of the invention, such as those ingredients necessary to activate and harden the resin mix, or to give it an appropriate color or tone. With regard to hardening and activating ingredients, it is preferred that suitable additives be mixed into the combination of resins so as to achieve activation and hardening in a suitable rate of time. Particularly preferred additives in this regard are cobalt alkanoate solution, which carries the commercial name Nuxtra Cobalt 12%; Cobalt 2-ethylhexanoate solution, which carries the commercial name Nuodex Octoate Cobalt 12% (both of which are products of CREANOVA, Inc.); and methyl ethyl ketone peroxide solution in plasticizer which carries the commercial name "Cadox M-50a," a product of Composite Materials, Inc. These compounds will be suitable to activate and harden the mixture of the above resins, although one skilled in this art would recognize that there are a number of other similar agents from other vendors which would also be suitable for the invention and would thus accomplish the same purpose.

With regard to the coloration of the inner material, it is preferred that a suitable material such as calcium carbonate be added to the resin mix if an opaque product is desired. In the preferred embodiment, calcium carbonate may be added in the ratio of about 9 parts calcium carbonate for every 13 parts by weight of the resin mix. Alternatively, if a translucent appearance for SALBA is desired, any of the alumina trihydrate series additives, such as brands sold under the designations SB-336, SB-432 or Hyfil-10 (produced by Composite Materials Inc.), are preferred instead of calcium carbonate. In this alternative embodiment, the alumina trihydrate will also preferably be used in the proportion of roughly 9 parts alumina trihydrate for every 13 parts of resin by weight in the inner material of the composition of the invention. As would be readily apparent to those of ordinary skill in this art, there are many other similar additives that could be used if either an opaque or translucent appearance is desired.

With regard to the outer gel coating of the composition of the present invention, it is generally preferred that a clear gel coat with excellent water resistant qualities be used. Among the particularly preferred gel coatings to be used in the invention are the isophthalic neopentyl glycol gels, such as those which are suitable for use in the marine industry. One particularly preferred gel coating is the coating identified as 67-TX2 blending clear gel coat produced by Lilly, Inc. If so desired, this clear gel coat can be mixed with suitable pigments in order to give the outer coating an appropriate color. In the preferred embodiment, a suitable pigment can be added in the amount of roughly 2 parts for every 10 parts of the gel coat.

In addition, it is also desirable to add other appropriate ingredients to the outer gel coating to improve its fire resistance and other important properties. For example, it is particularly preferred that a flame-retardant resin, such as Hetron FR610 or other fire-retardant resin as mentioned above, be added to the outer gel coating, and the preferred amount of this additive will be roughly four parts of the fire retardant resin for every 10 parts of the gel coating. With these additives, the outer gel coating of the present invention will have the following qualities: (1) it will suffer very minimal damage when exposed to an open flame and will thus be fire-resistant; (2) it will resist yellowing and UV degradation; (3) it will resist water and moisture; (4) it will be capable of withstanding substantial impact without cracking; (5) it will retain a glossy appearance and is readily cleaned and polished; (6) it will resist chemicals and salts; (7) it will resist gasoline, grease and diesel fuel and thus will be suitable for use in cars and boats; and (8) it will resist food oils and juices, and thus will be suitable for uses where the surface will come into contact with food products such as meats and frozen foods. Accordingly, through the use of an outer gel coating in accordance with the present invention, the building material composition of the invention will thus be suitable for an extremely wide variety of uses in homes, office buildings, automobiles and boats.

In another preferred embodiment in accordance with the present invention, wood pieces may be incorporated into the composition of the present invention when so desired to accommodate accessories such as locks or door knobs. In the usual case, these wood pieces will be placed inside the product and will not be visible from the surface. In the construction of the product of the present invention, when it is desired to incorporate a wooden piece for use as an accessory, a suitable mold can be constructed which will allow for an opening or other area in the resin composition of the invention into which the desired wood piece can be placed.

Still other ingredients can be added to the composition of the present invention in order to facilitate the process of making or molding a product in accordance with the invention. For example, if it desired to have a slower rate of curing, an appropriate additive may be included with the resin mix to achieve such a purpose, as would be recognized by one of ordinary skill in this art. In addition, materials such as acetone can be used as a thinner for the top gel coat in order to make this material easier to work with. Acetone, as an organic solvent, is readily available from chemical companies such as Alfa AESAR and others, and this compound will also be useful as a solvent for cleanup after finishing. Finally, a lubricating ingredient such as honey wax and a mold release wax, as mentioned earlier, are preferably used to coat the mold prior to the introduction of the resin mix in order to prevent the finished product from sticking to the mold after it has hardened.

As would be recognized by one of ordinary skill in this art, the building composition of the present invention can be constructed in any simple and efficient manner conventionally used to prepare molded materials comprised of hardenable resins. In the preferred embodiment, the composition of the invention is manufactured by first combining the desired ingredients making up the inner material layer of the composition in a suitable mold which will depend on the ultimate use of the product. In general, this process is carried out by first mixing the four resins as described above, namely (1) a fire retardant (2) a moisture-controlling resin, (3) a hardening and stabilizing resin, and (4) a resin that affords acid resistance. It is preferred that these resins be used in the composition in roughly equal amounts.

In addition, the inner material of the composition of the present invention is prepared by adding to these resins a suitable amount of chopped fiberglass, generally in a ratio equal to about one part of chopped fiberglass for every ten parts of the resins by weight. The overall amount of resin and chopped fiberglass needed in any particular case will depend on how big the desired end product is, and indeed the present composition is advantageous because it can be used economically and efficiently in cases where only a small amount of material is required, such as for a small piece of furniture, or in cases where larger amounts of SALBA will be used, e.g., for large cabinets, countertops or exterior doors.

In addition to the resin mixture and the chopped fiberglass, in the case where an opaque end product is desired, it is generally preferred that the calcium carbonate is used. But in the case where a translucent end product is desired, alumina trihydrate is preferably added to the resin/fiberglass mixture. In either case, it is preferred that these materials be provided in the ratio of about 9 parts calcium carbonate or alumina trihydrate for every 13 parts by weight of the resin mixture. When calcium carbonate is used, an appropriate pigment can also be added to provide the composition with a suitable opaque coloration. When alumina trihydrate is used, a suitable pigment may also be added so that the end product will have an appropriate color but will still remain translucent.

In the preferred method of the present invention, before pouring the mixture of resins and calcium carbonate into the mold, both halves of the mold should be first treated by coating or spraying them with a thin layer of honey wax and a mold release wax to ease the ultimate removal of the hardened mixture later from the mold. There are several of these mold release wax products which are suitable for use in the invention, including Ceara Mold Release, Formula Five, and Oscar's, all which are products of Plastex Inc. After spraying the mold release wax, it is also preferred that another thin layer (preferably of about 2 mm thickness) which forms the outer layer of the molded material should be deposited on both halves of the mold. This top layer preferably consists of a mixture of gel coat, a fire resistant resin, and the desired pigment. This thin layer provides additional fire and water resistance, and improves the product's ability to resist impact and degradation from elements such as chemicals, salts or ultraviolet radiation.

In the preferred embodiment, this outer gel coat comprises a waterproof exterior gel coating that is typically formulated for use in the marine industry, such as isophthalic neopentyl glycol composition which carries the commercial name "67-TX2 blending clear gel coat," as described above, which is a product of Lilly, Inc. It is also preferred that this clear gel coat be mixed with a resin which impart fire resistance, such as the Hetron 610 resin produced by the Ashland Chemical Company. In the desired top coating, around 4 parts of Hetron 610 resin will be added for every 10 parts of the gel coat. Finally, an appropriate pigment may also be added in the preferred ratio of about 2 parts pigment for every 10 parts of the gel coat used. As stated above, acetone or other suitable material may also be added as a thinner for the top coat to make it easier to work with.

Following the combination of the appropriate amounts of resin, chopped fiberglass, and opaque or translucent material, the mixture comprising the inner material of the invention is then mixed with the hardening material to initiate the interaction for hardening to take place. Appropriate activating and hardening agents, such as Nuxtra Cobalt 12% (produced by Creanova, Inc.) and/or Cadox M-50a (produced by Akzo Nobel Chemical, Inc.), are preferably added in the amount of about 0.001 to 0.01 by weight with respect to the above mixture of calcium carbonate or aluminum trihydrate and the resin mixture, to cause curing and hardening of the product. If a slower curing time is desired, such as to allow more time for working the material, the amounts of cobalt 12% and Cadox M-50a, mentioned above as activating materials, can be reduced to slow down the hardening time. Alternatively, appropriate agents which allow for a slower curing time may also be added to the resin mixture.

After preparing these ingredients as set forth above, this mixture is then poured into the desired mold prior to the time that the material is activated and hardened. In the preferred embodiment, as described above, a suitable lubricant such as honey wax or any of the mold release wax substances mentioned above, are used to coat the mold prior to the introduction of the resin mixture so as to ensure that the finished product will be readily removed from the mold after hardening.

In the preferred manner of manufacturing a product using the composition of the present invention, as indicated above, the inner material comprising a resin mixture, chopped fiberglass and appropriate activating and hardening agents will be poured into a suitable pretreated mold, such as will be further described below in Example 1. In the preferred embodiment, once a final product has been completed and left to harden for 2–24 hours, it may be removed from the mold for further finishing, cleaning, polishing and/or painting as necessary to obtain the desired end product.

As set forth above, the composition of the invention is thus suitable for use as a wood-replacement material in a variety of applications, and will be advantageous because it is fire-resistant, waterproof, resistant to environmental conditions and is highly impact-resistant, capable of withstanding pressures of greater than about 14,760 pounds per square inch (i.e., more than 2.5 times as strong as concrete). Although one skilled in this art would instantly recognize a variety of its uses and applications, the present invention can be used as a component in countless of applications as mentioned earlier. In addition, as would be recognized by one skilled in this art, the composition of the present invention would be suitable for use as a replacement material for a number of applications where fiberglass is used, such as in boats, cars, etc.

It is thus submitted that the foregoing embodiments are only illustrative of the claimed invention, and alternative embodiments not specifically set forth above that would be obvious to one skilled in the art also fall within the scope of the claims.

In addition, the following examples are presented as illustrative of the claimed invention, and are not deemed to be limiting of the scope of the invention, as defined by the claims appended hereto, in any manner.

EXAMPLE 1

A composition in accordance with the present invention was manufactured and hardened in a suitable mold using the procedures as set forth herein. In this example, the two halves of a suitable mold were first treated by coating or spraying their interiors with a thin layer of honey wax and a mold release wax to ease the removal of the hardened material later on. After that, a mixture of 1000 grams of 67-TX2 blending clear gel coat (a product of Lilly, Inc.) is mixed with about 400 grams of Hetron 610 resin as a fire resistant resin. The Hetron 610 resin is thus added at a ratio of about 4 parts by weight for every ten parts of the clear gel coat. In addition, about 200 grams of pigment is added to this mixture, or about 2 parts of pigment by weight for every ten parts of the clear gel coat. The mixture is then sprayed on the wax coating the mold to form a thin layer of about 2 millimeter thickness and then left to dry. This roughly 2 mm thickness layer forms the outer layer of the composition of the invention after hardening.

Next, after letting this thin outer layer dry, the product of the invention is manufactured by mixing roughly equal amounts of the four types of resins described above, including (1) the fire resistant resin (Hetron 610); (2) the moisture control resin (Aropol 7334); (3) the artificial marble resin (Aropol 8420), which makes the composition very hard with high dimensional stability; and (4) the mold-making gel coat (Aropol 7240) which makes the composition highly resistant to acid. The total weight of these resins was 4000 grams. To the mixture of resins was added 400 grams of chopped fiberglass, or roughly about 1 part chopped fiberglass for ten parts of the resin mix by weight. In addition, 3046 grams of calcium carbonate was added to the mixture of resin and chopped fiberglass, or roughly 9 parts of calcium carbonate for every 13 parts by weight of the resin mix.

Following the mixing of the resins, the ground fiberglass and the calcium carbonate, about 7.5 to 75 grams of Nuxtra Cobalt 12% and about 7.5 to 75 grams of Cadox M-50a are added to the resin mixture in order to activate and harden the mixture. After the mixture is mixed thoroughly, it will be poured in the pretreated mold, after the thin outer layer described above has dried. The two halves of the mold are then placed on a shaker or a vibrator for a few minutes until it is made sure that trapped air bubbles are removed from the mixture. After that, the two halves of the mold are brought together and compressed, and then are left to dry for a period of about 2 to 24 hours. The advantage of the shaker or the vibrator is to remove any air bubbles that might have been trapped in the pouring process of the resin mixture into the mold. After making sure that the inner material of the composition of the invention is completely dried, it is then be removed from the mold to obtain the final product, which may then be further polished or painted if so desired.

EXAMPLE 2

A composition was prepared in the same manner as described in Example 1. However, in this case, alumina trihydrate was added to the inner material instead of calcium carbonate in the proportion of roughly 9 parts of alumina trihydrate for every 13 parts by weight of the resin mix. The resulting product was similar to the product as formed in Example 1, except that the inner material was translucent instead of opaque.

What is claimed is:

1. A method of manufacturing a composite suitable for use as a building material comprising:
   a. treating a mold for a building material with a mold release wax;
   b. depositing onto the mold a thin layer comprising a gel and a flame retardant brominated polyester resin and allowing this layer to dry so as to form a waterproof outer gel coating;
   c. forming a moldable resin and fiberglass mixture comprised of chopped or ground fiberglass, a flame retardant brominated polyester resin, a moisture controlling resilient isophthalic polyester resin, a hardening and stabilizing polyester resin suitable for matched-die molding and an acid resistant isophthalic polyester resin; and
   d. depositing the resin and fiberglass mixture into the mold and allowing it to harden so as to form the composite suitable for use as a building material.

2. A method according to claim 1 further comprising adding a material to the resin and fiberglass mixture which will make the composite opaque.

3. A method according to claim 2 wherein the material that will make the composite opaque comprises calcium carbonate.

4. A method according to claim 1 further comprising adding a material to the resin and fiberglass mixture which will make the composite translucent.

5. A method according to claim 4 wherein the material that will make the composite translucent comprises alumina trihydrate.

6. A method according to claim 1 further comprising adding a hardening and activating agent to the resin and fiberglass mixture.

7. A method according to claim 6 wherein the hardening and activating agent is selected from the group consisting of cobalt alkanoate solution, cobalt 2-ethylhexanoate, methyl ethyl ketone peroxide solution, and combinations of the above.

8. A method according to claim 1 further comprising adding an agent to slow curing time.

9. A method according to claim 1 further comprising adding wood pieces to the resin and fiberglass mixture.

10. A method according to claim 1 further comprising adding a pigment to the waterproof outer gel coating.

11. A method according to claim 1 wherein the gel in the waterproof outer gel coating comprises a isophthalic neopentyl glycol.

12. A composite suitable for use as a building material produced by the method of claim 1.

13. A composite suitable for use as a building material comprising an inner material comprised of chopped or ground fiberglass, a flame retardant brominated polyester resin, a moisture controlling resilient isophthalic polyester resin, a hardening and stabilizing polyester resin suitable for matched-die molding and an acid resistant isophthalic polyester resin; and a waterproof outer gel coating comprised of a gel and a flame retardant brominated polyester resin.

14. A composite according to claim 13 wherein the inner material further comprises calcium carbonate.

15. A composite according to claim 13 wherein the inner material further comprises alumina trihydrate.

16. A composite according to claim 13 wherein the inner material further comprises a hardening and activating agent.

17. A composite according to claim 16 wherein the hardening and activating agent is selected from the group consisting of cobalt alkanoate solution, cobalt 2-ethylhexanoate, methyl ethyl ketone peroxide solution, and combinations of the above.

18. A composite according to claim 13 wherein the inner material further comprises an agent to slow curing time.

19. A composite according to claim 13 wherein the inner material further comprises wood pieces.

20. A composite according to claim 13 wherein the waterproof outer gel coating further comprises a pigment.

21. A composite according to claim 13 wherein the gel in the waterproof outer gel coating comprises a isophthalic neopentyl glycol.

* * * * *